US010253763B2

(12) United States Patent
Nakagami et al.

(10) Patent No.: US 10,253,763 B2
(45) Date of Patent: Apr. 9, 2019

(54) MOTOR-DRIVEN COMPRESSOR

(75) Inventors: Takashi Nakagami, Tokyo (JP);
Takayuki Takashige, Tokyo (JP);
Hiroyuki Kamitani, Tokyo (JP); Koji Nakano, Tokyo (JP)

(73) Assignee: MITSUBISHI HEAVY INDUSTRIES AUTOMOTIVE THERMAL SYSTEMS CO., LTD., Kiyosu-shi (JP)

( * ) Notice: Subject to any disclaimer, the term of this patent is extended or adjusted under 35 U.S.C. 154(b) by 480 days.

(21) Appl. No.: 13/822,833

(22) PCT Filed: Oct. 12, 2011

(86) PCT No.: PCT/JP2011/005713
§ 371 (c)(1),
(2), (4) Date: May 2, 2013

(87) PCT Pub. No.: WO2012/073423
PCT Pub. Date: Jun. 7, 2012

(65) Prior Publication Data
US 2013/0224050 A1   Aug. 29, 2013

(30) Foreign Application Priority Data

Nov. 30, 2010  (JP) ................... 2010-265983

(51) Int. Cl.
*H02K 5/22*   (2006.01)
*F04B 35/04*  (2006.01)
(Continued)

(52) U.S. Cl.
CPC .............. *F04B 35/04* (2013.01); *F01C 21/10* (2013.01); *F04B 39/121* (2013.01); *F04B 39/16* (2013.01);
(Continued)

(58) Field of Classification Search
CPC ........ H02K 5/22; H02K 5/225; H02K 11/001; H02K 11/0068; H02K 11/0073;
(Continued)

(56) References Cited

U.S. PATENT DOCUMENTS 4,297,627 A * 10/1981 Schaefer ................ H02K 17/30
310/71
5,331,239 A    7/1994 Kwun et al.
(Continued)

FOREIGN PATENT DOCUMENTS

| CN | 101589541 A | 11/2009 |
| EP | 2187055 A1  | 5/2010  |

(Continued)

OTHER PUBLICATIONS

Japanese Office Action dated Sep. 24, 2014, issued in corresponding JP application No. 2010-265983 with English translation (7 pages).
(Continued)

*Primary Examiner* — Quyen P Leung
*Assistant Examiner* — Robert E Mates
(74) *Attorney, Agent, or Firm* — Westerman, Hattori, Daniels & Adrian, LLP

(57) ABSTRACT

An object is to provide a motor-driven compressor capable of reducing cost required when a failure occurs in part of components configuring an inverter device. A power substrate assembly 50 is removably fixed to a housing body 10 in an inverter accommodation chamber 13, and a control substrate assembly 70 and a filter circuit assembly 90 are removably fixed to a cover 30. Therefore, when the cover 30 is removed from the housing body 10, the power substrate assembly 50, the control substrate assembly 70, and the filter circuit assembly 90 can be independently removed from the housing body 10 or the cover 30, and new power substrate assembly 50, control substrate assembly 70, and filter circuit
(Continued)

assembly 90 can be independently mounted on the housing body 10 or the cover 30.

6 Claims, 5 Drawing Sheets

(51) Int. Cl.
*F01C 21/10* (2006.01)
*F04B 39/12* (2006.01)
*F04B 39/16* (2006.01)
*F04C 23/00* (2006.01)

(52) U.S. Cl.
CPC ...... *F04C 23/008* (2013.01); *F04C 2240/808* (2013.01); *H02K 5/22* (2013.01)

(58) Field of Classification Search
CPC ........... H02K 11/0078; H02K 11/0084; H02K 11/0094; H02K 11/02; H02K 11/022; H02K 11/024; H02K 11/026; H02K 11/028; F04B 35/04; F04B 39/121; F04B 39/16; F04C 23/008; F04C 2240/808; F01C 21/10
USPC ......................................... 310/68 R, 68 D, 79
See application file for complete search history.

(56) References Cited

U.S. PATENT DOCUMENTS

| | | | | |
|---|---|---|---|---|
| 6,704,201 B2* | 3/2004 | Kasuga | ................... | H01L 25/11 165/185 |
| 6,717,318 B1* | 4/2004 | Mathiassen | ............ | H02K 11/33 310/179 |
| 2002/0070821 A1* | 6/2002 | Moller | ................. | H03H 1/0007 333/181 |
| 2003/0047304 A1 | 3/2003 | Kasuga | | |
| 2003/0094920 A1* | 5/2003 | Numaguchi et al. | ......... | 318/801 |
| 2003/0143090 A1* | 7/2003 | Iritani | ..................... | F04B 35/04 417/410.5 |
| 2003/0200761 A1 | 10/2003 | Funahashi et al. | | |
| 2008/0116838 A1 | 5/2008 | Hattori et al. | | |
| 2008/0160840 A1* | 7/2008 | Bax | .......................... | H01R 4/30 439/724 |
| 2008/0205107 A1* | 8/2008 | Hattori et al. | ................ | 363/123 |
| 2008/0295808 A1* | 12/2008 | Tateishi | ............... | B01D 35/027 123/497 |
| 2009/0096301 A1* | 4/2009 | Sumi | ...................... | H02K 11/33 310/89 |
| 2010/0172770 A1 | 7/2010 | Ichise et al. | | |

FOREIGN PATENT DOCUMENTS

| | | |
|---|---|---|
| JP | 06-002770 U | 1/1994 |
| JP | 06-030547 A | 2/1994 |
| JP | 08-144961 A | 6/1996 |
| JP | 10-098887 A | 4/1998 |
| JP | 2002-159161 A | 5/2002 |
| JP | 2003-164112 A | 6/2003 |
| JP | 2004-312925 A | 11/2004 |
| JP | 2007-263061 A | 10/2007 |
| JP | 2008-148011 A | 6/2008 |
| JP | 2009-114961 A | 5/2009 |
| JP | 2009-148011 A | 7/2009 |

OTHER PUBLICATIONS

Notification of Transmittal of Translation of the International Preliminary Report on Patentabililty (Form PCT/IB/338) of International Application No. PCT/JP2011/005713 dated Jun. 6, 2013 with Form PCT/IPEA/409.

International Search Report of PCT/JP2011/005713, dated Jan. 10, 2012.

Office Action dated Sep. 24, 2014, issued in corresponding Chinese Patent Application No. 201180046148.3 with English Translation (21 pages).

Office Action dated Jun. 13, 2018, issued in counterpart European Application No. 11 844 783.8 (5 pages).

* cited by examiner

MOTOR-DRIVEN COMPRESSOR

TECHNICAL FIELD

The present invention relates to a motor-driven compressor and, in particular, to a motor-driven compressor in which an inverter controlling the driving of an electric motor is assembled inside a housing of the compressor.

BACKGROUND ART

A motor-driven compressor includes an electric motor driving a compression mechanism unit, and generally further includes an inverter device controlling and driving this electric motor. As this motor-driven compressor, an inverter-device integrated type has been known in which the inverter device is assembled in the housing of the motor-driven compressor. An example has been known such that an area where the inverter device is to be accommodated is filled and sealed with gel to fix the inverter device inside the housing. However, in this example, the inverter device is fixed to the housing of the motor-driven compressor or the like with the filling gel, and thus it is impossible or not easy to remove the inverter device from the motor-driven compressor. Therefore, for example, even if only the inverter device is broken, it is required to replace the entire motor-driven compressor, instead of replacing only the inverter device.

To address this problem, in Patent Document 1, an inverter assembly is configured of a substrate (a) having an electric circuit including a switching element, a component (b) including at least one of a capacitor and a coil, and a base (c) supporting the substrate and the component. Patent Document 1 further suggests that the inverter assembly is removably fixed inside an inverter accommodation chamber of a housing.

CITATION LIST

Patent Document

Patent Document 1: Japanese Patent Laid-Open No. 2007-263061

SUMMARY OF THE INVENTION

Technical Problems to be Solved by the Invention

According to Patent Document 1, since the housing of the motor-driven compressor and the inverter assembly are removably fixed, the inverter assembly can be easily removed from the motor-driven compressor.

However, it is assumed in the inverter assembly of Patent Document 1 that the substrate (a), the component (b), and the base (c) are integrally handled. Therefore, the substrate (a) and the component (b) are soldered or bonded for fixation, and the base (c) and the component (b) are soldered or bonded for fixation. Therefore, it is not easy to separate the substrate (a) and the component (b) from each other and the base (c) and the component (b) from each other.

Here, the switching element, a control circuit such as a CPU (including software), and a filter unit configuring the inverter assembly have different failure modes and, in most cases, only part of these components breaks down. In these cases, according to the suggestion of Patent Document 1, it is required to replace the entire inverter assembly including a normal part. For this reason, cost for handling failures is increased.

The present invention was made based on these problems, and has an object of providing a motor-driven compressor capable of reducing cost required when a failure occurs in part of components configuring an inverter device.

Solution to the Problems

An inverter device can be divided according to the function into a portion (a power unit) where a switching circuit configured of a semiconductor switching element such as an IGBT is implemented and direct current power is converted to three-phase alternating current power for application to an electric motor, a portion (a control unit) where a control communication circuit configured of an element operating at a low voltage such as a CPU is implemented and alternating current power to be applied to the electric motor is controlled, and a portion (a filter unit) including a common mode coil, a normal mode coil and a smoothing capacitor provided in a power-supply line for suppressing noise and suppressing noise of the inverter device.

In the present invention made therein, a motor-driven compressor includes a housing body, an inverter device, an inverter device accommodation chamber provided to a housing body and a cover, wherein the inverter device is configured of a power unit converting direct-current power to three-phase alternating current power for application to an electric motor, a control unit controlling alternating current power to be applied to the electric motor, and a filter unit including at least one of a capacitor and a coil and suppressing noise of the inverter device. At least one of the power unit, the control unit, and the filter unit is removably fixed to the housing body in the inverter accommodation chamber, and at least another one of the power unit, the control unit, and the filter unit is removably fixed to the cover.

According to the motor-driven compressor of the present invention, at least one of the power unit, the control unit, and the filter unit is removably fixed to the housing body in the inverter accommodation chamber, and at least another one of these units is removably fixed to the cover. Therefore, when the cover is removed from the housing body, the power unit, the control unit, and the filter unit can be independently removed from the housing body or the cover, and also a new power unit, control unit, and filter unit can be independently mounted on the housing body or the cover.

Here, the housing body according to the present invention accommodates a compression mechanism unit and an electric motor that drives the compression mechanism unit.

The inverter device converts direct-current power to polyphase alternating current power for supply to the electric motor and controls the number of revolutions of the electric motor.

The inverter accommodation chamber is provided to the housing body as having an opening, and accommodates the inverter device. Accommodation herein does not necessitate accommodation of the entire inverter device, and includes accommodation with partial protrusion of the inverter device from the inverter accommodation chamber.

The cover blocks the opening of the inverter accommodation chamber. The cover is removable from the housing body.

In the motor-driven compressor of the present invention, preferably, the power unit and the control unit are connected via a connector, and the power unit and the filter unit are connected via a connector.

Electric connection can be reliably obtained between the power unit and the control unit and between the power unit and the filter unit without a special operation.

In the motor-driven compressor of the present invention, the power unit is preferably removably fixed to the housing body.

An object is to promote cooling of the power unit with a large calorific value associated with operation by using refrigerant flowing inside the housing body.

In the motor-driven compressor of the present invention, the filter unit is preferably fixed to the cover with an adhesive.

An object is to promote cooling of the filter unit by transmitting heat at the filter unit to the cover via the adhesive.

In the motor-driven compressor of the present invention, preferably, the power unit and the control unit are modularized and removably fixed to the housing body and the filter unit is fixed to the cover.

Since components of an electric system (the power unit and the control unit) can be collectively handled, this assembling for modularization can be performed only on a line of the electric system.

Advantageous Effects of Invention

According to the present invention, when replacing component at the time of a failure, only a failed portion among the power unit, the control unit, and the filter unit can be replaced, and therefore cost for handling failures can be decreased.

The present invention also has the following effects: a failed portion can be easily identified; when specifications of any portion are changed, only the portion where its specifications have been changed can be replaced; and portions other than the portion to be replaced are not directly touched, and thereby decreasing a risk of breaking another substrate due to static electricity, an impact, or others because of handling.

DESCRIPTION OF EMBODIMENTS

The present invention is described in detail below based on embodiments shown in the accompanying drawings.

Figure 1:
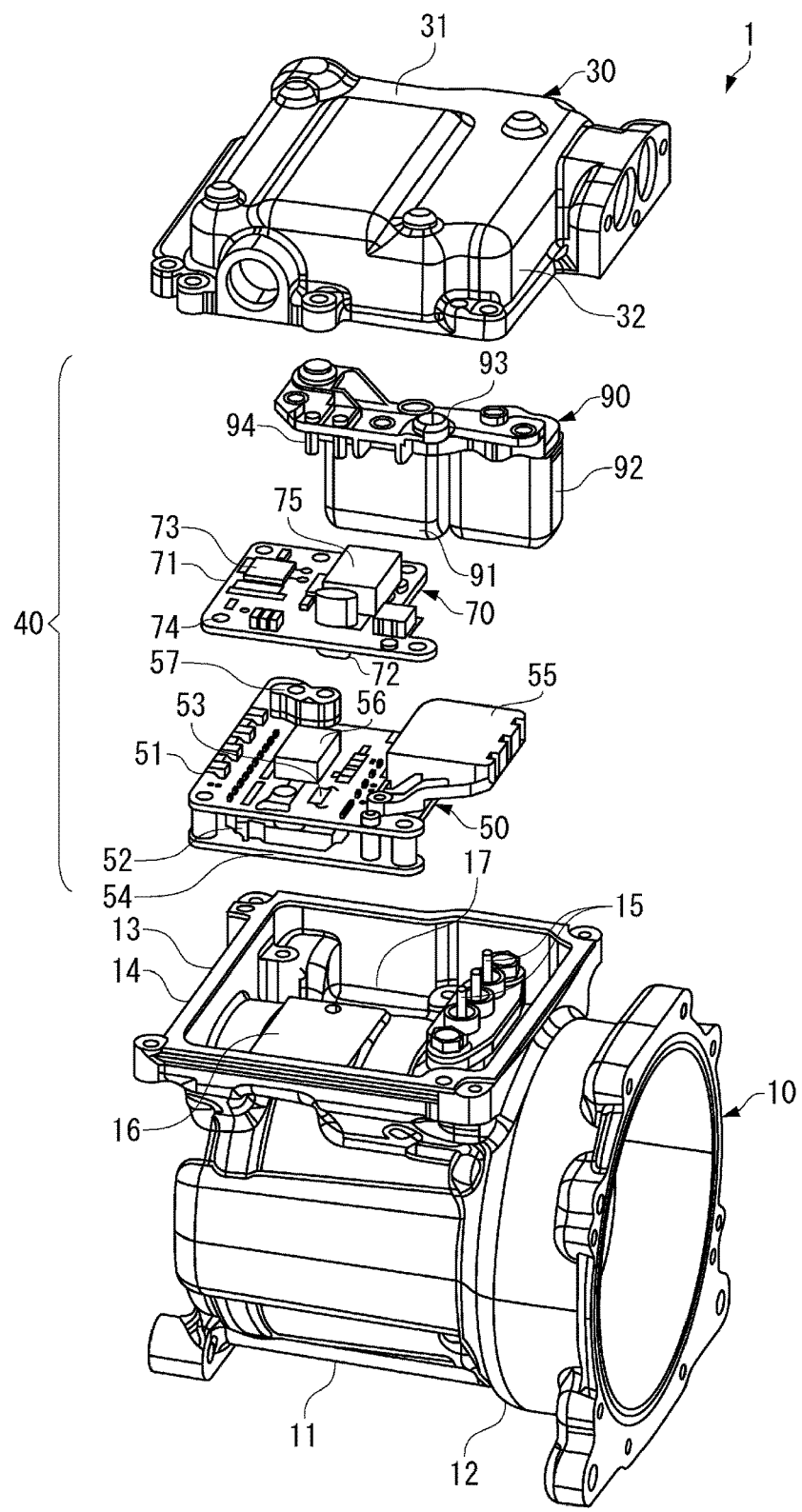
FIG. 1 is an exploded perspective view of a motor-driven compressor in the present embodiment.
Figure 2:
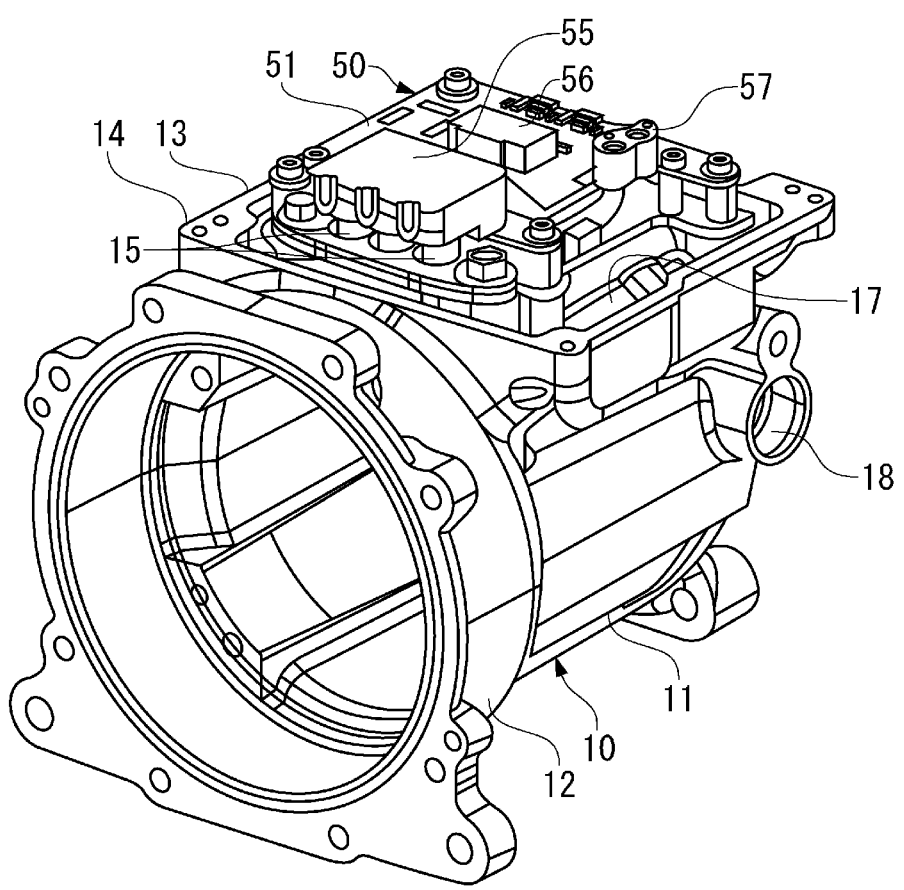
FIG. 2 is a perspective view of a housing body where a power substrate assembly is mounted.
Figure 3:
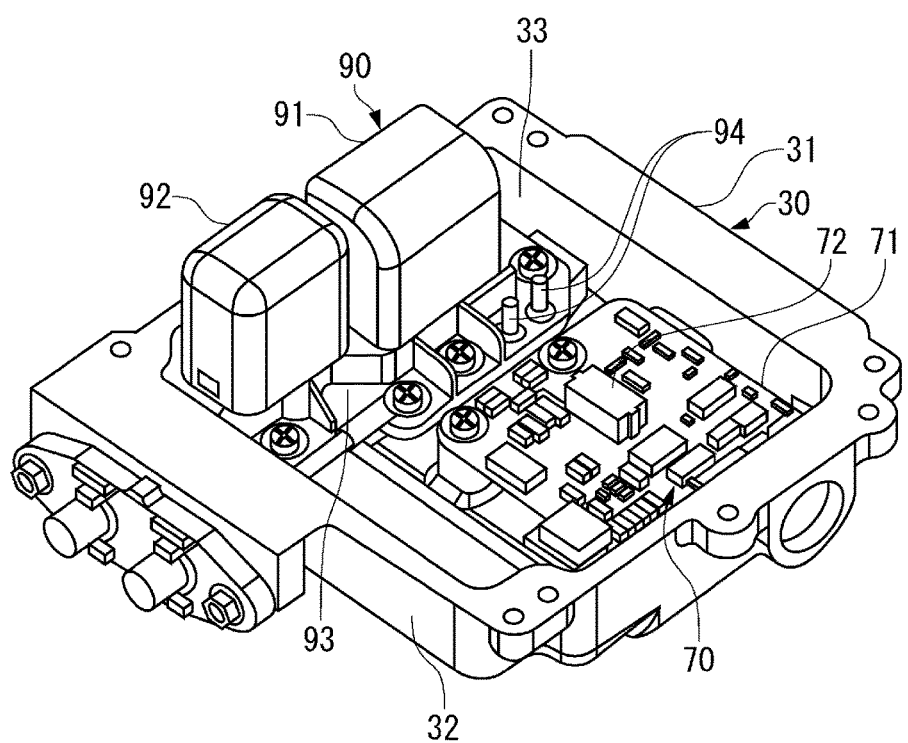
FIG. 3 is a perspective view of an inverter cover on which a control substrate assembly and a filter circuit assembly are mounted.

As shown in FIG. 1 to FIG. 3, a motor-driven compressor (hereinafter simply referred to as a compressor) 1 of an inverter-device integrated type in the present embodiment includes a housing body 10, a cover 30 blocking an opening of an inverter accommodation chamber 13 of the housing body 10, a power substrate assembly 50 fixed inside the inverter accommodation chamber 13 of the housing body 10, a control substrate assembly 70 fixed inside the accommodation chamber 33 of the cover 30, and a filter circuit assembly 90 fixed inside the accommodation chamber 33 of the cover 30. The power substrate assembly 50, the control substrate assembly 70, and the filter circuit assembly 90 configure an inverter device 40.

<Housing Body 10>

The housing body 10 configuring an outer shell of the compressor 1 includes a motor housing portion 11 in which an electric motor omitted in the drawings is accommodated and a compression mechanism housing portion 12 in which a compression mechanism omitted in the drawings is accommodated. The housing body 10 is made by aluminum die casting, and the motor housing portion 11 and the compression mechanism housing portion 12 may be integrally formed or may be separately fabricated and then integrated with a bolt or the like.

The electric motor and compressor omitted in the drawings and accommodated and set inside the housing body 10 are coupled via a motor shaft, and the compressor is driven by the rotation of the electric motor. A suction port 18 is provided to the motor housing portion 11, and low-pressure refrigerant gas suctioned from this suction port to the motor housing portion 11 flows around the perimeter of the electric motor and is then suctioned to the compression mechanism for compression. The refrigerant gas at high temperature and high pressure compressed by the compression mechanism is discharged inside the compression mechanism housing portion 12, and is then discharged from a discharge port (omitted in the drawings) provided to the compression mechanism housing portion 12 to a refrigeration cycle outside.

An inverter accommodation chamber 13 is provided on an upper part of the motor housing portion 11. The inverter accommodation chamber 13 has a box structure surrounded by side walls 14 having a predetermined height with an upper surface open. Inside the inverter accommodation chamber 13, a motor terminal 15 electrically connected to the electric motor accommodated inside the motor housing portion 11 is arranged. Also, on the bottom of the inverter accommodation chamber 13, a holding surface 16 holding the power substrate assembly 50 is formed. Furthermore, the inverter accommodation chamber 13 is provided with a filter accommodation chamber 17, which is a space where a smoothing capacitor 91 and a coil 92 configuring the filter circuit assembly 90 are partially accommodated when the cover 30 is mounted on the housing body 10.

<Cover 30>

The cover 30 is a box-shaped member including a top plate 31 and side walls 32 pendent from a circumferential edge of the top plate 31, and a space surrounded by the top plate 31 and the side walls 32 forms an accommodation chamber 33. Inside the accommodation chamber 33, a boss and a bolt hole (omitted in the drawings) for fixing the control substrate assembly 70 and the filter circuit assembly 90 are formed.

The cover 30 is fixed to the motor housing portion so as to block the opening of the inverter accommodation chamber 13 with the chamber 33 of the top plate 31 oriented downward. Here, with top faces of the side walls 14 of the inverter accommodation chamber 13 and top faces of the side walls 32 butting with each other, the cover 30 is positioned with respect to the housing body 10. With a packing interposed between butting surfaces, a hermetic state inside the housing body 10 is ensured. Note that, as with the housing body 10, the cover 30 is also fabricated by aluminum die casting.

<Power Substrate Assembly 50>

The power substrate assembly 50 is supplied with high voltage, for example, 300 V from an outside high-voltage power supply (not shown in the drawings). The power substrate assembly 50 has a back surface side where a switching element 52 configured of a plurality of IGBTs is mounted and a front surface side including a power substrate 51 where a current and voltage detection circuit 53 is mounted. The control substrate assembly 70, which will be described further below, is provided with a CPU 73 for controlling the operation of the switching element 52. When a control signal from the CPU 73 is transmitted to the power substrate 51 and is inputted to the switching element 52, the switching element 52 operates. As a result, a high voltage supplied from the high-voltage power supply becomes a three-phase alternating current applied to the electric motor of the motor-driven compressor 1, thereby rotating and driving the electric motor.

On a back surface side of the power substrate 51, a radiator plate 54 is arranged a predetermined space away from the power substrate 51. The radiator plate 54 has its front surface side being in contact with the switching element 52. With the power substrate assembly 50 being mounted at a predetermined position of the inverter accommodation chamber 13 of the housing body 10, the radiator plate 54 has its back surface side being in contact with the holding surface 16. Accordingly, heat occurring at the switching element 52 is transmitted via the radiator plate 54 to the housing body 10, and cooling of the switching element 52 is promoted by the refrigerant flowing through the housing body 10.

On a front surface side of the power substrate 51, a connector 55 for motor connection is mounted. The power substrate 51 and the electric motor are connected via the connector 55 and the motor terminal 15. And, the three-phase alternating current power generated by the operation of the switching element 52 is applied to the electric motor of the motor-driven compressor 1 via the connector 55 and the motor terminal 15.

Also, on the front surface side of the power substrate 51, a connector 56 for control substrate connection is mounted. The power substrate 51 and the control substrate assembly 70 are connected via the connector 56 and a connector 72. The connector 72 is provided on the control substrate assembly 70. When a control signal from the control substrate assembly 70 is transmitted to the power substrate 51 via the connector 56 and the connector 72 and is inputted to the switching element 52, the switching element 52 operates.

Furthermore, on the front surface side of the power substrate 51, a connector 57 for filter circuit connection is mounted. The power substrate 51 and the filter circuit assembly 90 are connected via the connector 57 and a connector 94. A direct current voltage supplied from the high-voltage power supply is smoothed by the filter circuit assembly 90 and is then provided to the switching element 52 via the connector 57 and the connector 94.

In the power substrate assembly 50, the filter circuit assembly 90, the switching element 52, the current and voltage detection circuit 53, and others are fixed in advance to the power substrate 51 by soldering, and handled in this unit.

<Control Substrate Assembly 70>

The control substrate assembly 70 has a function of controlling the operation of the switching element 52 of the power substrate assembly 50. The control substrate assembly 70 includes a control substrate 71 having a back surface side where the connector 72 is mounted and a front surface side where the CPU 73 is mounted. On the front surface side of the control substrate 71, electronic components such as an interface circuit 74 performing communications with the power substrate assembly 50 and a power supply circuit 75 are mounted.

The control substrate assembly 70 has the connector 72, the CPU 73, and others fixed in advance to the control substrate 71 by soldering, and handled in this unit.

<Filter Circuit Assembly 90>

The filter circuit assembly 90 includes the smoothing capacitor 91 and the coil 92 for smoothing the direct current voltage supplied from the high-voltage power supply for supply to the power substrate assembly 50. While the direct current voltage inputted to a P-N terminal omitted in the drawings is inputted via the smoothing capacitor 91 to the switching element 52 of the power substrate 51, common mode noise and current ripples are reduced by the coil 92 and the smoothing capacitor 91.

The smoothing capacitor 91 is formed by molding a thinned ceramic-based capacitor material or film-based capacitor material with resin. Similarly, the coil 92 is formed by molding a coil material with resin.

The filter circuit assembly 90 includes a bus bar 93. By being mounted on the bus bar 93, the smoothing capacitor 91 and the coil 92 are electrically connected and held by the bus bar 93. On a back surface side of the bus bar 93, the connector 94 is mounted. The bus bar 93 is formed by molding a conductive core material with resin, and insulation is ensured except a portion required for conduction.

The filter circuit assembly 90 has the smoothing capacitor 91, the coil 92, and others mounted in advance on the bus bar 93 and handled in this unit.

Note that as the coil 92, an inductor coil for controlling switching noise and reducing current ripples is normally applied together with the smoothing capacitor 91. Other than this, a common mode coil for reducing common mode noise can be applied.

<Mounting of Power Substrate Assembly 50 and Others>

Meanwhile, the compressor 1 according to the present embodiment has the inverter device 40 configured of three assemblies, that is, the power substrate assembly 50, the control substrate assembly 70, and the filter circuit assembly 90.

As shown in FIG. 2, the power substrate assembly 50 is accommodated in the inverter accommodation chamber 13, and is removably fixed to the housing body 10 by using a fastener such as a bolt. With such configuration, the radiator plate 54 of the power substrate assembly 50 is brought into close contact with the holding surface 16 facing the inverter accommodation chamber 13. Also, with the power substrate assembly 50 being mounted at the predetermined position of the housing body 10, the connector 55 and the motor terminal 15 are connected. This bonding is made with the connector 55 and the motor terminal 15 fitting into each other, and operation such as soldering and bolt fastening is not required.

On the other hand, as shown in FIG. 3, the control substrate assembly 70 is accommodated in the accommodation chamber 33 at a predetermined position, and is removably fixed to the cover 30 by using a fastener such as a bolt. Similarly, the filter circuit assembly 90 is removably fixed to the cover 30.

As described above, the power substrate assembly 50, the control substrate assembly 70, and the filter circuit assembly 90 configuring the inverter device 40 are fixed to the housing body 10 or the cover 30 so as to be removed and attached independently.

After the cover 30 having the control substrate assembly 70 and the filter circuit assembly 90 fixed thereto is positioned at a predetermined position covering the upper opening of the inverter accommodation chamber 13, the cover is fixed to the housing body 10 with a bolt or the like, thereby configuring the compressor 1. Thus, the connector 56 of the power substrate assembly 50 and the connector 72 of the control substrate assembly 70 are connected, and the connector 57 of the power substrate assembly 50 and the connector 94 of the filter circuit assembly 90 are connected. Since these connections are made between connectors, a connecting operation other than pushing the positioned cover 30 toward the housing body 10 is not required. Also, When the cover 30 is removed from the housing body 10, the connections between the connectors can be released without a special operation.

In the compressor 1 described above, the power substrate assembly 50, the control substrate assembly 70, and the filter circuit assembly 90 configuring the inverter device 40, are fixed to the housing body 10 or the cover 30 so as to be able to be independently removed and attached. Therefore, when any of the power substrate assembly 50, the control substrate assembly 70, and the filter circuit assembly 90 breaks down, after the cover 30 is removed from the housing body 10, only the failed assembly is replaced by a new assembly, thereby lowering cost for handling at the time of failure.

Also, with the power substrate assembly 50, the control substrate assembly 70, and the filter circuit assembly 90 being independent from each other, the following effects can be further provided.

First, it is easy to identify a failed assembly. For example, the power substrate assembly 50 and the control substrate assembly 70 each having a normal function are combined with the filter circuit assembly 90 that has been used so far to configure the inverter device 40 to check the operation, and if the operation is abnormal, the filter circuit assembly 90 in use can be identified as being broken.

Next, when specifications of any assembly are changed, only the assembly where its specifications have been changed can be replaced. For example, the current capacitance of the filter circuit assembly 90 is increased, only the filter circuit assembly 90 can be replaced. This change in specifications also applies to the power substrate assembly 50 and control substrate assembly 70.

Furthermore, with the power substrate assembly 50 being fixed to the housing body 10 and the control substrate assembly 70 and the filter circuit assembly 90 being fixed to the cover 30, when the power substrate assembly 50 is replaced, an operator to perform replacement can replace the power substrate assembly 50 without directly touching the control substrate assembly 70 and the filter circuit assembly 90. There is a risk in which a touch by human hand at the time of replacement operation generates static electricity or an impact associated with the operation occurs to break the power substrate assembly 50. However, since the control substrate assembly 70 and the filter circuit assembly 90 are not directly touched, the risk of breakage can be avoided. Similarly, the control substrate assembly 70 or the filter circuit assembly 90 fixed to the cover 30 can be replaced without directly touching the power substrate assembly 50.

While the compressor 1 according to the present invention has been described above, the present invention is not restricted to this, and changes as in the following (1) to (3) can be made.

(1) Any type of assembly can be removably fixed to the housing body 10 and the cover 30. That is, the present invention includes a mode in which at least one of the power substrate assembly 50, the control substrate assembly 70, and the filter circuit assembly 90 is fixed to the housing body 10 or the cover 30. For example, the control substrate assembly 70 or the filter circuit assembly 90 can be fixed to the housing body 10, and the power substrate assembly 50 can be fixed to the cover 30.

(2) To the cover 30, it is not necessarily required to removably fix an assembly.

Figure 4:
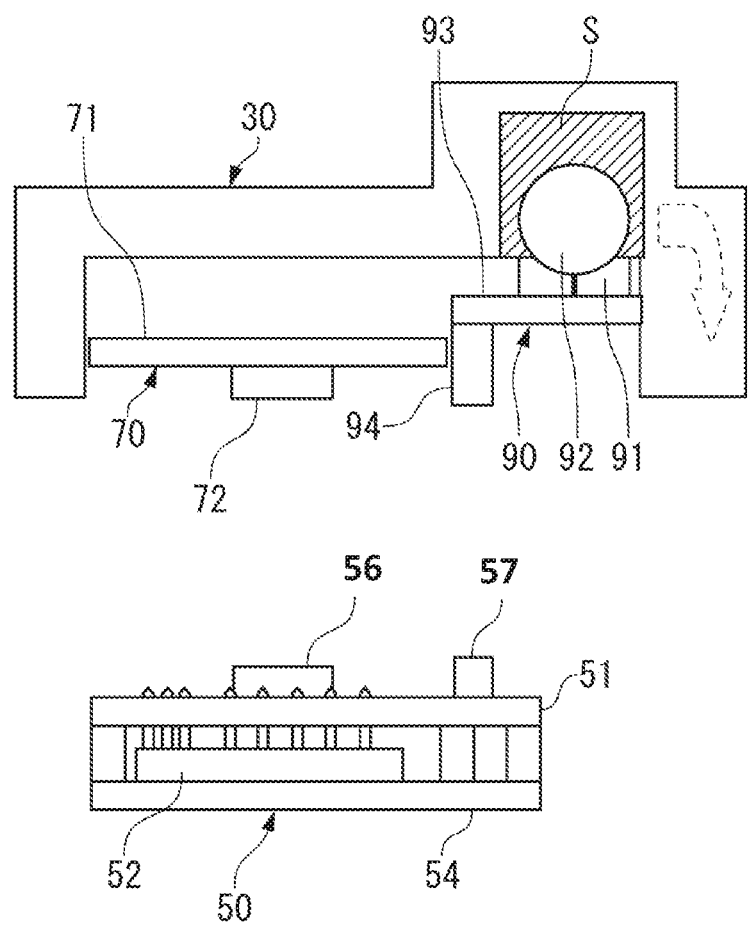
FIG. 4 is a schematic diagram of an example in which the filter circuit assembly is fixed to the cover with an adhesive.

For example, as shown in FIG. 4, while the control substrate assembly 70 is removably fixed to the cover 30 with a fastener such as a bolt as described above, the filter circuit assembly 90 is fixed to the cover 30 with an adhesive S. In this case, although the filter circuit assembly 90 is unable to be removed from the cover 30, when the filter circuit assembly 90 is replaced, a cover 30 having the filter circuit assembly 90 fixed thereto is prepared for replacement of the cover 30 as a whole.

According to this embodiment, heat occurring at the filter circuit assembly 90 is transmitted to the cover 30 via the adhesive S, and therefore a cooling effect can be increased compared with a case in which a space is present in the circumference of the filter circuit assembly 90.

Note that components identical to those in FIG. 1 to FIG. 3 are provided with the same reference numeral in FIG. 4. The same applies to FIG. 5.

(3) Two assemblies can be integrated as a module.

Figure 5:
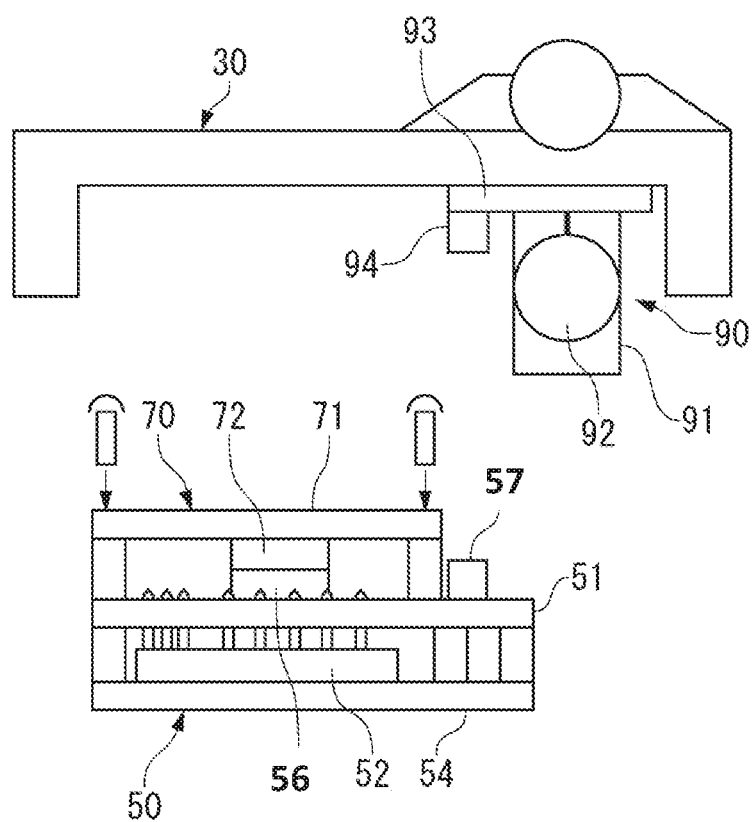
FIG. 5 is a schematic view of an example in which a power substrate assembly and the control substrate assembly are integrated and modularized in the present embodiment.

For example, as shown in FIG. 5, the power substrate assembly 50 and the control substrate assembly 70 are fastened with a bolt for modularization and removably fixed to the housing body 10. With such configuration, components of an electric system (the power substrate assembly 50 and the control substrate assembly 70) can be collectively handled, and therefore assembling for modularization can be performed on a line dedicated to the electric system. On the other hand, if the filter circuit assembly 90 is removably fixed to the cover 30, this assembling can be performed on a line dedicated to a mechanical system. That is, according to this embodiment, an assembly line of the electric system and the assembly line of the mechanical system can be advantageously completely separated from each other.

Other than the above, the structures cited in the embodiments described above can be selected, omitted, changed to another structure as appropriate, or combined as long as such selection, omission, change, or combination does not deviate from the gist of the present invention.

REFERENCE SIGNS LIST

1 . . . motor-driven compressor
10 . . . housing body, 13 . . . inverter accommodation chamber, 15 . . . motor terminal, 17 . . . filter accommodation chamber
30 . . . cover, 33 . . . accommodation chamber, 40 . . . inverter device
50 . . . power substrate assembly, 51 . . . power substrate, 52 . . . switching element 55, 56, 57, 72, 94 . . . connector
70 . . . control substrate assembly, 71 . . . control substrate, 73 . . . CPU
90 . . . filter circuit assembly, 91 . . . smoothing capacitor

The invention claimed is:

1. A motor-driven compressor comprising:
a housing body accommodating a compression mechanism unit and an electric motor that drives the compression mechanism unit;
an inverter device converting direct-current power to polyphase alternating current power for supply to the electric motor and controlling a number of revolutions of the electric motor;

an inverter accommodation chamber provided to the housing body as having an opening, the inverter accommodation chamber accommodating the inverter device; and a cover blocking the opening and removably provided to the housing body, wherein the inverter device is configured of a power unit converting direct-current power to three-phase alternating current power for application to the electric motor, a control unit controlling alternating current power to be applied to the electric motor, and a filter unit including at least one of a capacitor and a coil and suppressing noise of the inverter device, the power unit is removably fixed to the housing body in the inverter accommodation chamber, the control unit, and the filter unit are arranged side by side in the cover and removably fixed to the cover, wherein the power unit, the control unit and the filter unit are provided independently from each other such that the power unit is independently mounted on or removed from the housing body, the control unit is independently mounted on or removed from the cover and the filter unit is independently mounted on or removed from the cover;

the power unit and the control unit are connected via a connector for a control unit connection provided on a front surface side of the power unit and a first connector for a power unit connection provided on a surface side of a control substrate included in the control unit, the surface side of the control substrate facing the front surface side of the power unit, the power unit and the filter unit are connected via a connector for a filter unit connection provided on the front surface side of the power unit and a second connector for a power unit connection provided on a surface side of the filter unit, the surface side of the filter unit facing the front surface side of the power unit; and the connector for the control unit connection and the first connector are connected to each other, and the connector for the filter unit connection and the second connector are connected to each other.

2. The motor-driven compressor according to claim 1, wherein the filter unit is fixed to the cover with an adhesive.

3. The motor-driven compressor according to claim 1, wherein the power unit at least includes a switching element configured of a plurality of IGBTs, and the control unit at least includes a CPU for controlling the operation of the switching element.

4. The motor-driven compressor according to claim 1, wherein the connector for the control unit connection, the first connector, the connector for the filter unit connection and the second connector are members distinct from one another.

5. The motor-driven compressor according to claim 1, wherein the connector for the control unit connection and the first connector are configured such that a control signal from the control unit is transmitted to the power unit via the connector for the control unit connection and the first connector.

6. The motor-driven compressor according to claim 1, wherein the connector for the filter unit connection and the second connector are configured such that a direct current voltage smoothed by the filter unit is provided to the power unit via the connector for the filter unit connection and the second connector.

* * * * *